US006751178B1

(12) United States Patent
Lee et al.

(10) Patent No.: US 6,751,178 B1
(45) Date of Patent: Jun. 15, 2004

(54) OPTICAL RECORDING MEDIUM AND RECORDING/REPRODUCTION METHOD THEREOF

(75) Inventors: Kyung-geun Lee, Sungnam (KR); Seong-sin Joo, Suwon (KR); In-sik Park, Suwon (KR); Byung-in Ma, Suwon (JP); Jae-seong Shim, Seoul (KR); Du-seop Yoon, Suwon (KR); Byoung-ho Choi, Suwon (KR); Yong-kwang Won, Suwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 09/553,157

(22) Filed: Apr. 20, 2000

(30) Foreign Application Priority Data

Apr. 21, 1999 (KR) ........................ 1999-14286
Jun. 25, 1999 (KR) ........................ 1999-24296

(51) Int. Cl.$^7$ ................................ G11B 7/00
(52) U.S. Cl. ................. 369/59.25; 369/47.22; 369/47.27; 369/275.3; 369/275.4
(58) Field of Search ............... 369/47.19, 47.35, 369/47.47, 59.25, 44.26, 44.29, 44.34, 275.3, 275.4, 53.2, 53.41, 124.07, 124.08, 47.22, 47.27

(56) References Cited

U.S. PATENT DOCUMENTS

| | | | | |
|---|---|---|---|---|
| 5,377,178 A | * | 12/1994 | Saito et al. ............ | 369/124.07 |
| 5,848,050 A | * | 12/1998 | Nagasawa et al. ....... | 369/275.4 |
| 5,953,297 A | * | 9/1999 | Maeda et al. ........... | 369/47.47 |
| 6,147,961 A | * | 11/2000 | Nagasawa et al. ....... | 369/275.3 |
| 6,172,961 B1 | * | 1/2001 | Tanoue et al. .......... | 369/275.4 |
| 6,208,603 B1 | * | 3/2001 | Ishida et al. ............ | 369/59.25 |
| 6,285,638 B1 | * | 9/2001 | Konishi et al. .......... | 369/47.19 |
| 6,469,980 B1 | * | 10/2002 | Takemura et al. ....... | 369/275.3 |

FOREIGN PATENT DOCUMENTS

| | | |
|---|---|---|
| JP | 6-243468 | 9/1994 |
| JP | 7-110944 | 4/1995 |
| JP | 10-275335 | 10/1998 |
| JP | WO98/54703 | 12/1998 |
| JP | 11-45441 | 2/1999 |

OTHER PUBLICATIONS

Office Action from Japanese Application issued Mar. 18, 2003.
Access Method for Single–Spiral Land/Groove Recording Disc; ITE Television Conference Technology Report, vol. 20, No. 16, ISSN 386–4227, pp. 29–34, dated Feb. 29, 1996.
Japanese Office Action for Japanese Application No. 2000–121697, dated Nov. 4, 2003.

* cited by examiner

Primary Examiner—Thang V. Tran
Assistant Examiner—Bach Vuong
(74) Attorney, Agent, or Firm—Staas & Halsey LLP

(57) ABSTRACT

An optical recording medium and a recording/reproducing method therefor to stably and accurately address a basic recording and/or reproducing unit (a sector or a frame) when a track pitch is decreased for recording of a large capacity of data. The general information (e.g., a variable frequency oscillator, a sector number, a sector type, and error detection information) of a corresponding sector is read from a header, which has physical pits between adjacent land and/or groove tracks, before recording or reproducing. The arrangement of the header is in the form of physical pits, with a sector structure where 2-kilobyte minimum recording units are included in a user area within a basic recording unit of 4 kilobytes, which thereby reduces overhead and facilitates the generation of a servo control signal.

52 Claims, 11 Drawing Sheets

FIG. 6

| DISC | 4.7 GB RAM | 18 GB HD-RAM |
|---|---|---|
| PIT DEPTH | | λ/6 |
| Tp | 0.615 μm | 0.303 μm |
| PIT WIDTH | | ~0.7 MML |
| BASE JITTER (%) | 6.0% (MEASURED VALUE:6.8~11%) | 6.5% / 7.0% |
| MARGIN (±10%) OFF-TRACK | Tp/2 | Tp/2 / 0 |
| DEFOCUS | ±1.0 μm | ±0.38 μm / ±0.55 μm |
| DETRACK | ±0.15 μm | ±0.048 μm / ±0.1 μm |
| R_TILT | ±0.35° | ±0.16° / ±0.42° |
| T_TILT | ±0.35° | ±0.14° / ±0.31° |

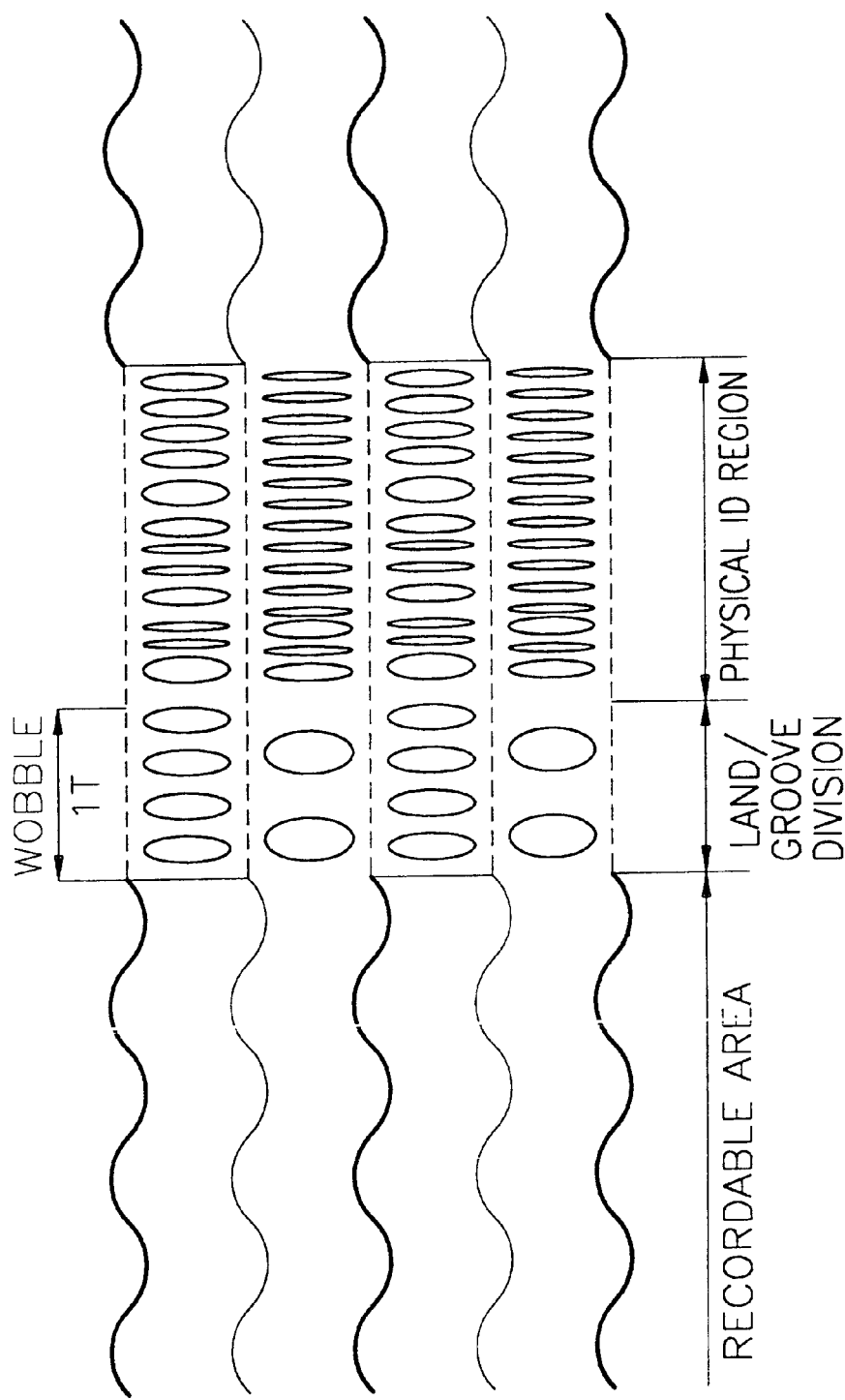

OPTICAL RECORDING MEDIUM AND RECORDING/REPRODUCTION METHOD THEREOF

CROSS-REFERENCE TO RELATED APPLICATIONS

This application is based upon and claims priority of Korean Application Nos. 99-14286 and 99-24296, Apr. 21, 1999 and Jun. 25, 1999 respectively, in the Korea Patent Office, the disclosures of which are incorporated herein by reference.

BACKGROUND OF THE INVENTION

1. Field of the Invention

The present invention relates to an optical recording medium, and more particularly, to an optical recording medium, and a recording/reproduction method therefor, in which a header, used for addressing, is disposed between adjacent land and/or groove tracks, a basic addressing unit having a first predetermined size is assigned, and a minimum recording unit having a second predetermined size is assigned.

2. Description of the Related Art

A mass recording capacity and high speed reproduction of optical discs is required for recording and/or reproducing high definition (HD) images. Accordingly, a multimedia technology of recording and/or reproducing a large quantity of information on and/or from a recording medium such as a rewritable or read only HD-digital versatile disc (DVD) is required.

Various methods have been suggested for satisfying the requirements of mass recording capacity and high speed reproduction. For example, the area of a disc or the rate of rotation may be increased. However, such methods are not practical since they require an increase in the sizes of a disc and a player and also result in increased production cost. Thus, it is preferable to increase the recording density per unit area of the disc, rather than increase the area of a disc at the rate of rotation.

The size of a recording laser spot is proportional to the laser wavelength and inversely proportional to the numerical aperture (NA) of an object lens. Accordingly, to increase the recording density per unit area of the disc, the laser wavelength should be decreased, or an object lens having a high numerical aperture should be used to decrease track pitch.

In such an optical disc, particularly, a recordable disc, a recording area for recording data in regular units is segmented into regular basic recording units (e.g., sectors or frames). In writing or reading data to or from an area which is a physically segmented basic recording unit, it is essential for an optical pick-up unit (hereinafter, referred to as a pickup) to move to the exact position of the corresponding area at high speed without error.

To allow a pickup to move to an exact position a header field in the optical disc is utilized. In a 2.6 gigabyte (GB) or 4.7 GB DVD-RAM, a header field for each sector is assigned 128 bytes. The information of the header field is written on the disc in the form of pre-pits during the manufacture of a substrate. The header field is composed of a variable frequency oscillator region for a phase locked loop (PLL), a physical identifier (PID) region to which a sector number is assigned, an ID error detection (IED) region for storing ID error detection information, and a postamble (PA) region for regulating modulation. A header field is appropriately disposed at the front portion of a sector. When a pickup accesses a desired position, a microcomputer (not shown), recognizing signals which are stored in the header field and picked up by the pickup, can detect the sector number and sector type of a sector corresponding to the accessed position and determine whether the sector is included in a land track or a groove track. Moreover, the microcomputer can perform servo control using the picked up signals.

Representative examples of the structures of conventional headers are shown in FIGS. 1A through 1D. "G" indicates a groove track, and "L" indicates a land track. In FIG. 1A, a header is located between adjacent land and groove tracks. In this structure, the track pitch is narrowed as the recording density increases, thus, crosstalk between adjacent tracks may occur.

In FIG. 1B, a single header is located at the boundary between a land track and a groove track. The single header can be used for a pair of land and groove tracks. This structure produces more advantageous signals than the structure of FIG. 1A since the width of a header of FIG. 1B is wider than the width of the header in the structure of FIG. 1A. However, since the arrangement of headers is unbalanced, this structure is susceptible to a tracking offset (or margin).

In FIG. 1C, a header is located between adjacent groove and land tracks such that headers are not adjacent between the adjacent land and groove tracks. In this structure, crosstalk does not occur. However, servo control compensation cannot be achieved. Therefore, an additional servo control compensation method is required.

The structure of FIG. 1D is used in a DVD-RAM. Compared to the structure of FIG. 1C, a header is shifted by half of a track pitch. The structure of FIG. 1D compensates for the drawbacks of the structures of FIGS. 1A, 1B and 1C. However, since half of a header is offset from the other half of the header by one track pitch, the manufacture of this structure is more difficult compared to the other structures. For this reason, particularly in a 4.7 GB DVD-RAM having the structure of FIG. 1D, the signal characteristics (jitter) of first and second header fields may not be the same as those of third and fourth header fields. The content of the header field will later be described with reference to FIGS. 4A and 4B.

To provide mass storage capacity of HD image data, for example, 15–20 GB, a recordable area (user data area) needs to be increased by minimizing not only track pitch but also areas (overhead) other than a recording area. The size of header fields in a DVD-RAM is about 5% of the physical sectors of the DVD-RAM. To achieve high density recording, by decreasing the size of an overhead, a structure for decreasing header fields, that is, a structure in which a header field is located at the boundary between adjacent tracks as shown in FIGS. 1B and 1D, is necessary. However, as described above, in the structure of FIG. 1B, servo control compensation, including track offset, must be implemented.

FIGS. 2A through 2C show examples of a typical track structure. FIG. 2A shows a concentric circle track structure. FIG. 2B shows a double spiral track structure. FIG. 2C shows a single spiral track structure used in a DVD-RAM. Reference numeral 1 indicates a groove track, reference numeral 2 indicates a land track, and reference numeral 3 indicates a header assigned to each basic recording unit (here, a sector).

Particularly in the single spiral track structure of FIG. 2C, a land track can be distinguished from a groove track at a land/groove track transition position 4, at which the land track transitions to the grove track or the groove track transitions to the land track, based on a detection of the land/groove track transition position signal and according to the arrangement of a header therein.

For discs having the single spiral track structure of FIG. 2C and the header structures of FIGS. 1B, 1C and 1D, the header structures of the discs, at a position at which groove tracks are connected to land tracks, are shown in FIGS. 3A, 3B, and 3C. It can be determined whether a sector including a header belongs to a land track or a groove track using a header signal (for example, a two-divisional signal of a photodetector) at a position at which the groove track is connected to the land track.

Accordingly, in the header structure of FIG. 1A, it can be determined whether a sector including a header belongs to a land track or a groove track, at a position at which the land track is connected to the groove track, from pre-pit information within the header. In the header structure of FIG. 1B, it can be determined whether a sector including a header belongs to a land track or a groove track, at a position at which the land track is connected to the groove track as shown in FIG. 3A, from pre-pit information within the header or from a header signal. In the header structure of FIG. 1C, it can be determined whether a sector including a header belongs to a land track or a groove track at a position, at which the land track is connected to the groove track as shown in FIG. 3B, from pre-pit information within the header or from a time difference between header detections. In the header structure of FIG. 1D, since a header extends over a land track and a groove track and half of the header is offset from the other half of the header by one track pitch, it can be determined whether a sector including a header belongs to the land track or the groove track, at a position at which the land track is connected to the groove track, as shown in FIG. 3C, from pre-pit information within the header or from a header signal.

In FIG. 1B, the header can be commonly used for indicating the land and groove tracks since it extends over the land and groove tracks. However, when information for indicating whether the sector, including the header, belongs to the land track or the groove track is recorded in a header of the same length as headers in other header structures (FIGS. 1C and 1D), it is not advantageous to utilize the structure of FIG. 1B because the other structures include offsetting half of the header from the other half of the header by one track pitch.

FIGS. 4A and 4B show an example of the content of a conventional header. In the header of FIG. 4A, employed in a method of performing servo control at a constant angular velocity (CAV), the address of a sector is represented by a track number and a sector number. Alternatively, in the header of FIG. 4B, employed in a method of performing servo control at a zoned constant linear velocity (ZCLV) for use in a DVD-RAM, since the number of sectors in each track is different, addressing information is represented by only a sector number without using a track number. The sector number is embedded in a PID region of FIG. 4B.

In a case in which a third header field and a fourth header field are offset from a first header field and a second header field by one track pitch (FIG. 1D), the first and third header fields have a 36-byte VFO1 which is longer than an 8-byte VFO2 included in the second and fourth header fields as shown in FIG. 4B. When the header is arranged without offset, the length of VFO1 in the first and third header fields may be set to 8 bytes which is the same as assigned to VFO2 in the second and fourth header fields. Further, the number of header fields can be decreased because the header fields have the same signal characteristics.

FIG. 5 shows a slice level and a PID signal provided through a first channel indicating a header detection signal corresponding to a change in a header, that is, a sum signal of two-divisional signals of a photodetector, when the header is arranged with offset. Referring to FIG. 5, fluctuation occurs at a position A at which the first and second header fields are connected to the third and fourth header fields and at the slice level, which is used for slicing, for a predetermined period of time. Accordingly, the magnitude of VFO1 (represented by reference numeral 3) of the third header field is set to 36 bytes which is the same as that of VFO1 (represented by reference numeral 1) of the first header field. A drive detects only the latter 8 bytes from each VFO1 in the first and third header fields, not the first 28 bytes.

When a HD disc of 20 GB or more, which will be developed in the near future, uses a complementary allocated pit address (CAPA) structure (FIG. 1D), used in a conventional 4.7 GB DVD-RAM or a structure in which headers are shifted by half of the track pitch (Tp/2), for common use by land and groove tracks as shown in FIG. 1B, base jitter problems do not occur. However, the margin characteristics become much worse compared to a conventional 4.7 GB disc or a HD disc having an on-track structure, that is, a structure in which headers are not shifted (off-track=0), as shown in FIG. 6.

SUMMARY OF THE INVENTION

To solve the above problems, a first object of the present invention is to provide an optical recording medium having a sector structure in which a user area of a basic recording unit is physically divided into units of a first predetermined size (4 KB) and in which the user area is logically divided into a second predetermined size (2 KB) in order to reduce the amount of overhead.

A second object of the present invention is to provide an optical recording medium for improving the reliability of a system by disposing headers in the middle of land and groove tracks in the form of physical pits.

A third object of the present invention is to provide a method of recording and reproducing user data in and from an optical recording medium having headers between adjacent land and/or groove tracks, and having sectors which are basic recording units physically divided into units of a first predetermined size (4 KB) and where a user area within the basic recording units is logically divided into minimum recording units of a second predetermined size (2 KB).

Additional objects and advantages of the invention will be set forth in part in the description which follows and, in part, will be obvious from the description, or may be learned by practice of the invention.

To achieve the above objects and other objects, the present invention provides an optical recording medium including a header area, which indicates address information and is added to basic recording units of a first predetermined size, wherein a user area within the basic recording unit is divided into minimum recording units of a second predetermined size.

To achieve the above objects and other objects, the present invention provides a method of recording/reproducing information on/from an optical recording medium in an optical recording medium recording and reproducing apparatus. The method includes the steps of recording address information in a header area added to each basic recording unit of a first predetermined size, and dividing a user area within the basic recording unit into minimum recording units of a second predetermined size and recording information in the minimum recording units.

The method of the present invention also includes the steps of reading the address information in the header area from the optical recording medium and addressing the basic recording unit, and reproducing data in the user area in the minimum recording units within the addressed basic recording unit.

BRIEF DESCRIPTION OF THE DRAWINGS

The above objects and advantages of the present invention will become more apparent by describing in detail preferred embodiments thereof with reference to the attached drawings in which:

FIG. 6 is a table for comparing the signal characteristics of discs having off track headers with the signal characteristics of a disc having on-track headers;

FIG. 10 is a diagram illustrating mirrors included in a sector at a position where the land and groove tracks of FIG. 9 are connected;

DETAILED DESCRIPTION OF THE INVENTION

Figure 7:
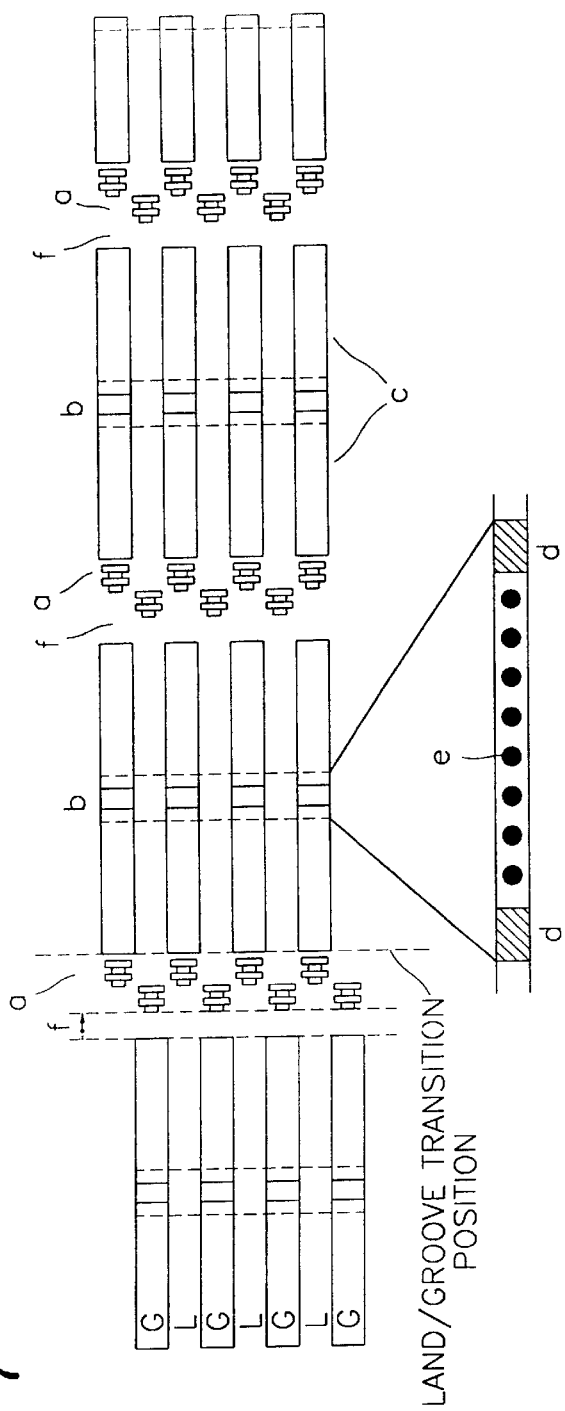
FIG. 7 illustrates a structure of headers and sectors according to a first embodiment of the present invention.

FIG. 7 shows a header structure and a position where a land track transitions to a groove track and a groove track transitions to a land track. Reference character G denotes a groove track, reference character L denotes a land track, reference character a denotes a header disposed in front of a basic recording unit, reference character b denotes a region for division of sectors, that is, a logical sector boundary portion, and reference character c denotes a user data area. A predetermined recording pattern e indicating the boundary between buffer fields d is recorded in the logical sector boundary portion b.

The header a stores an even or odd logical sector number, such that addressing is performed by skipping one conventional logical sector of 2 KB for compatibility with typical DVD RAMs. The buffer field d is a redundant region for complying with an accurate control requirement of a spindle motor in a digital versatile disc-random access memory (DVD-RAM). The buffer field d may be disposed at either one side or both sides of the logical sector boundary portion b. Alternatively, the buffer field d may not be used. A mirror f may be included in the header a and disposed immediately before a physical identifier (PID) to indicate the start of the PID. The mirror f may also be disposed immediately after the PID.

Figures 4A, 4B:
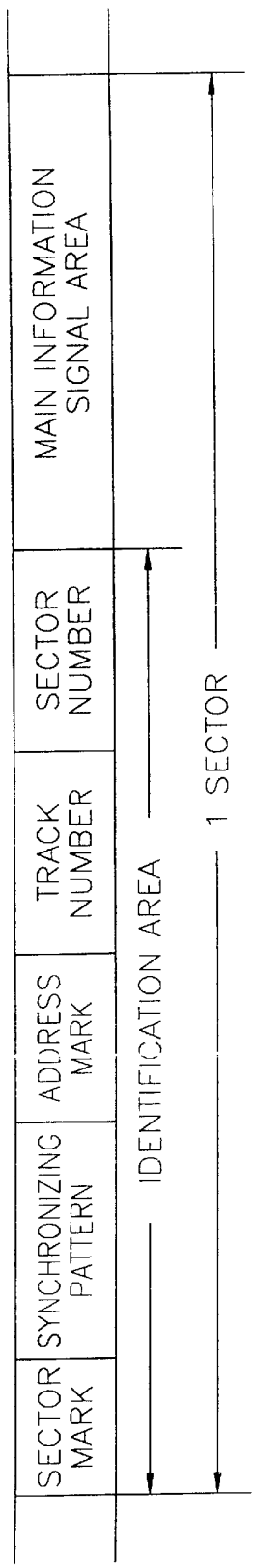
FIGS. 4A and 4B illustrate examples of the content of a conventional header.

In the present invention, a header in the form of physical pits is disposed between adjacent groove and/or land tracks. Half of a header is offset from the other half of the header by one track pitch. Accordingly, headers are not adjacent between adjacent tracks. A header is physically added to each basic recording unit whose size is, for example, 4 KB, to reduce the amount of overhead. To logically divide a sector composed of a physical 4-KB unit into 2-KB units, the predetermined recording pattern e is recorded as shown in FIG. 7. The predetermined recording pattern e may be, for example, pattern data having a fixed frequency like data stored in a variable frequency oscillator region VFO1 of FIG. 4B. The physical 4-KB unit is referred to as a basic recording unit, and the logical 2-KB unit is referred to as a minimum recording unit. 4 KB is referred to as a first predetermined size, and 2 KB is referred to as a second predetermined size.

Data in a header area and data in a user area may be modulated by different data modulation schemes. For example, pit position modulation (PPM), which does not require precise detection performance and has a characteristic of low recording density, may be used for the header a, and a mark edge recording (MER) method, which requires a precise detection performance and allows for a high recording density, may be used for the user area c. Alternatively, the same modulation scheme may be used for data in both header and user areas.

In a disc having such a header and sector structure, address information is stored in the header of each 4-KB basic recording unit. A user area in the basic recording unit is divided into 2-KB minimum recording units, and information is recorded in minimum recording units. When reproducing information from the disc, the address information in the header is read and data is addressed in basic recording units. Data in the user area is reproduced in minimum recording units included in the addressed basic recording unit.

Figure 8:
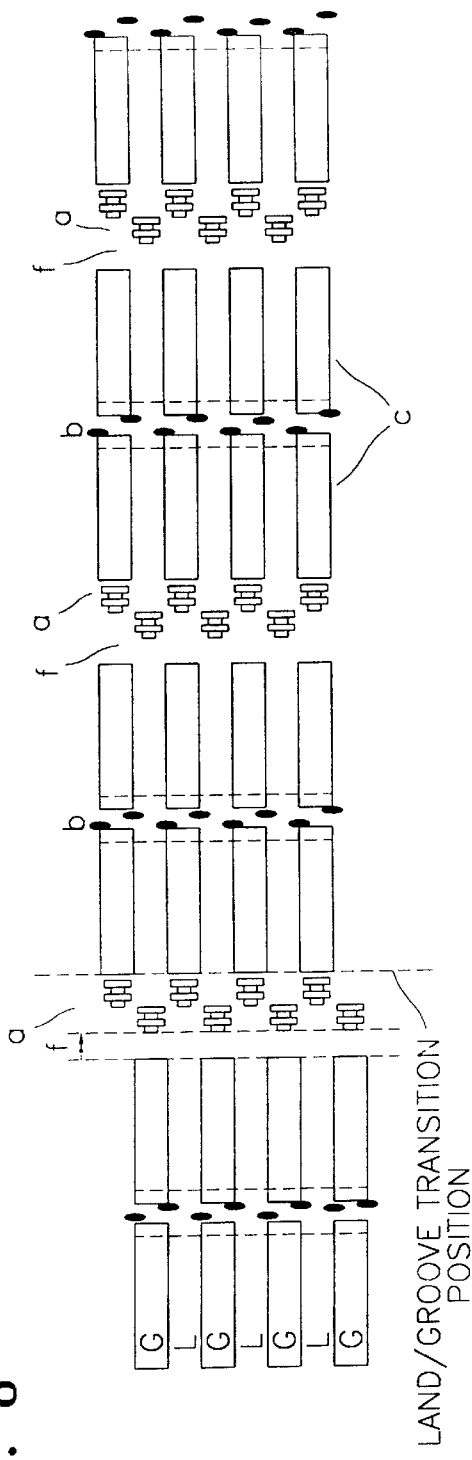
FIG. 8 illustrates a structure of headers and sectors according to a second embodiment of the present invention.

FIG. 8 shows a header and sector structure according to a second embodiment of the present invention. The structure of FIG. 8 is different from that of FIG. 7 in that a wobble pit pattern is recorded in the logical sector boundary portion b.

Figure 9:
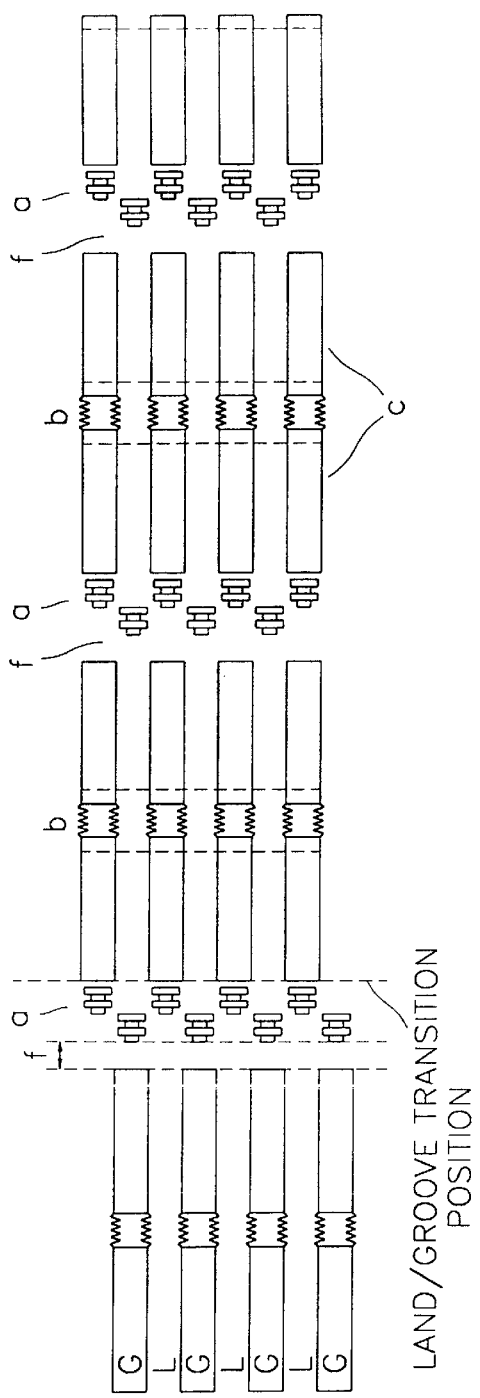
FIG. 9 illustrates a structure of headers and sectors according to a third embodiment of the present invention.

FIG. 9 shows a header and sector structure according to a third embodiment of the present invention. The structure of FIG. 9 is different from that of FIG. 7 in that a wobble groove pattern of a predetermined frequency is recorded in the logical sector boundary portion b. The wobble frequency of the logical sector boundary portion b is a frequency high enough to lock data in the next user area to a phase locked loop (PLL). A predetermined pit pattern as shown in FIG. 10 may be recorded in the mirror f, included in the last sector of each track, to provide land/groove switching information.

A pit pattern recorded in a land track may be different from that in a groove track.

When a mirror is provided in front of a PID to discriminate the PID from a track (a groove or land track) for recording, the length of the mirror of the last sector of a track may be set to be different to the length of the mirrors of the other sectors of the track. The position of the mirror of the last sector of a track may be different to the position of the mirrors of the other sectors of the track, or the number of mirrors of the last sector of a track may be set to be different to the number of mirrors of the other sectors of the track, in order to sort out land/groove switching information. The mirror described above can be adopted for use in all the embodiments of the present invention.

Although not shown in FIGS. 7 through 9 and 11 through 13, which show the examples of a header and sector structure according to the present invention, a land track and/or a groove track usually have/has a wobble track of a predetermined frequency as shown in FIG. 10. Accordingly, when the wobble frequency of a data area connected to a PID region is high enough to lock data to a PLL, a frequency different from a land/groove wobble frequency will be used as the wobble frequency of the logical sector boundary portion b of FIG. 9. By doing this, a variable frequency oscillator (VFO) region for the PLL in the PID can be eliminated, so that overhead can be further reduced. When the VFO region is used, reliability can be increased.

Figure 11:
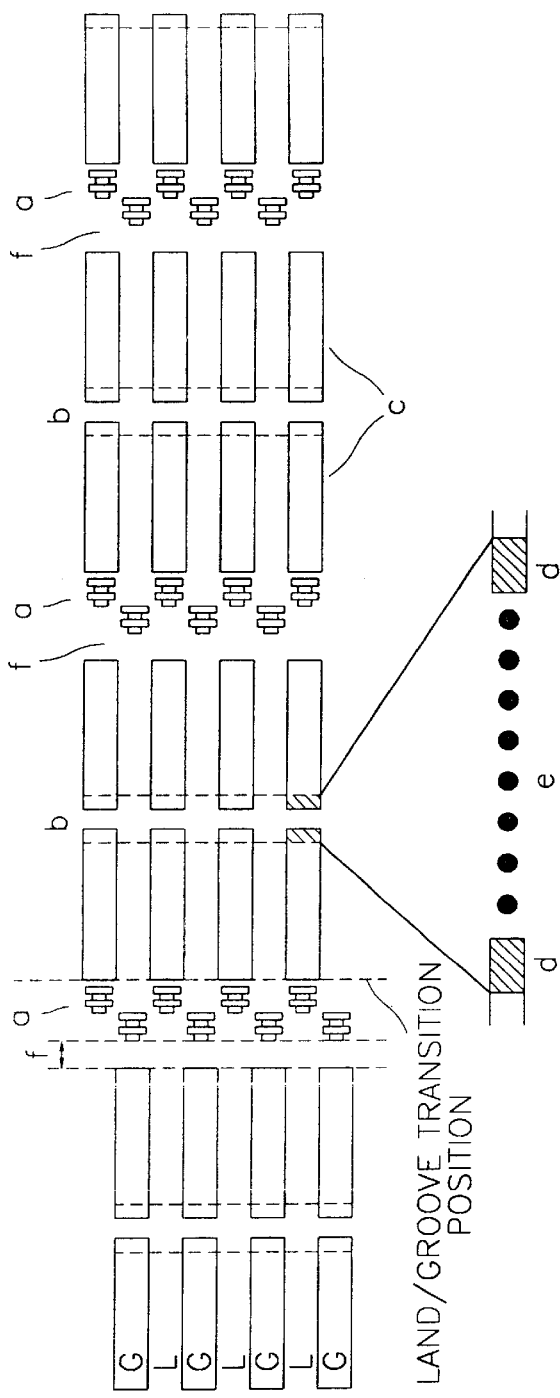
FIG. 11 illustrates a structure of headers and sectors according to a fourth embodiment of the present invention.

FIG. 11 is a diagram showing a header and sector structure according to a fourth embodiment of the present invention. The structure of FIG. 11 is different from that of FIG. 7 in that the logical sector boundary portion b is formed by recording the predetermined recording pattern e in the form of pre-pits on a mirror between the buffer fields d.

Figure 12:
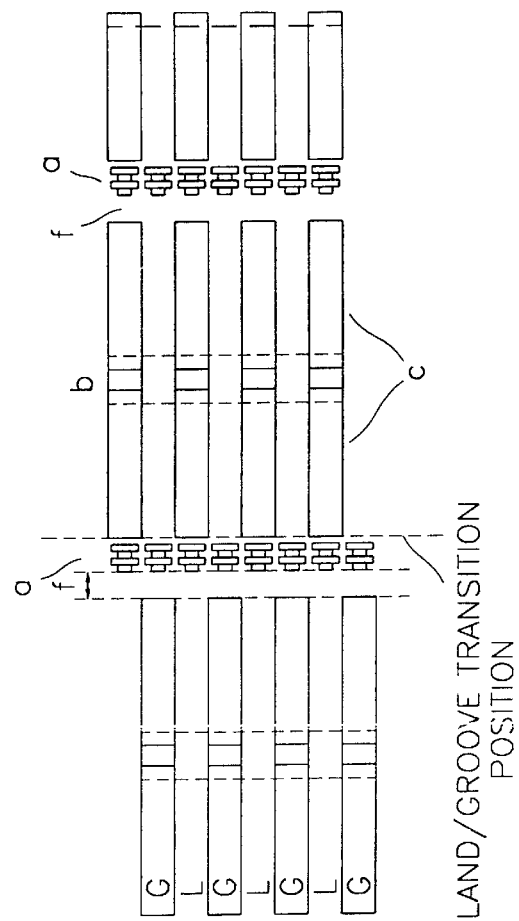
FIG. 12 illustrates a structure of headers and sectors according to a fifth embodiment of the present invention.

FIG. 12 is a diagram showing a header and sector structure according to a fifth embodiment of the present invention. In FIG. 7, since headers are disposed in between adjacent groove and/or land tracks, and half of a header is offset from the other half of the header by one track pitch, headers of adjacent tracks are not adjacent. On the other hand, in FIG. 12, a header is disposed in each track in a similar pattern. As in FIG. 7, predetermined pattern data may be recorded in the logical sector boundary portion b. As in FIG. 8, a wobble pit pattern may be recorded in the logical sector boundary portion b. As in FIG. 9, a wobble groove pattern of a predetermined frequency may be recorded in the logical sector boundary portion b. And in FIG. 11, a predetermined pattern may be recorded in the logical sector boundary portion b in the form of pre-pits.

Figure 13:
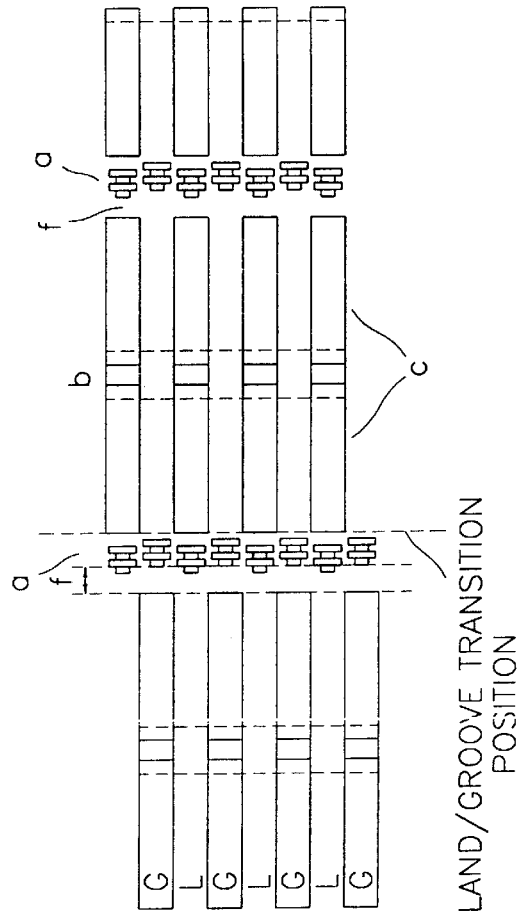
FIG. 13 illustrates a structure of headers and sectors according to a sixth embodiment of the present invention.

FIG. 13 is a diagram showing a header and sector structure according to a sixth embodiment of the present invention. Compared to the structure of FIG. 12, the starting points of header fields of adjacent tracks are different, such that fields of adjacent tracks that are in similar positions in the different header fields of FIG. 13 are not the same. In the structure of FIG. 13, the lengths of mirrors f immediately before each PID, in the headers of adjacent tracks, are different. The difference in the length of a mirror can be used to determine whether a sector belongs to a land track or a groove track.

The positioning of a PID in a sector structure in which a header is disposed in the middle of each of the groove and land tracks, as shown in the embodiments of the present invention illustrated in FIGS. 7 through 13, and in which a sector has a user area of a size exceeding PID+2 KB, can be applied to each of the header structures of FIGS. 1A through 1D.

Figure 14:
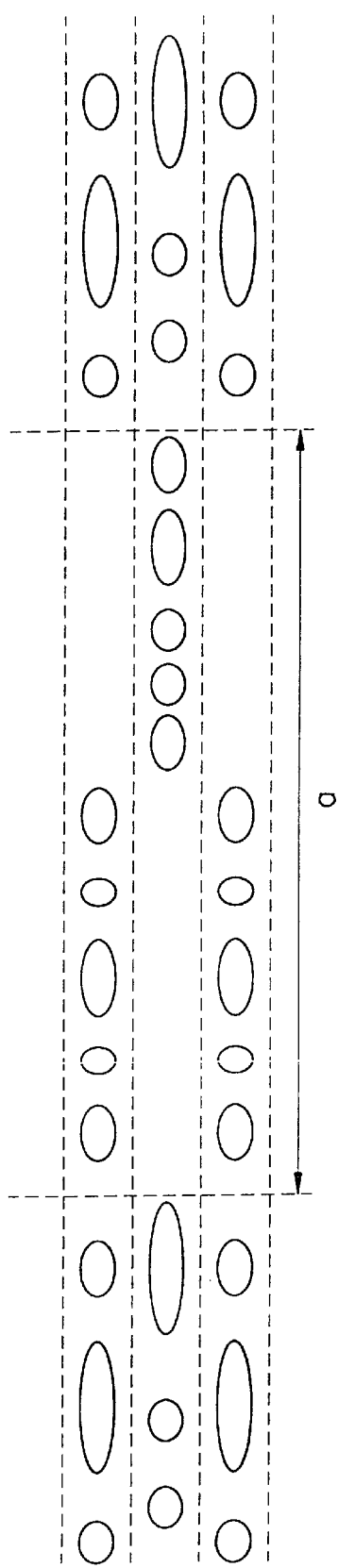
FIG. 14 illustrates a structure of pre-pits in a read only memory (ROM) disc including a header structure according to the present invention.

Even if physical formats shown in FIGS. 7, 9, 11, 12 and 13 are applied to HD-ROMs, as shown in FIG. 14, a problem related to playback compatibility with DVD-RAMs and DVD-ROMs does not occur.

FIG. 14 shows a pre-pit structure of a ROM disc, which includes a header structure according to the present invention. The embodiments shown in FIGS. 7, 9, 11, 12 and 13 can be applied to ROM type discs such as DVD-ROMs and HDROMs. However, the header and sector structures of FIGS. 12 and 13, in which a logical sector boundary portion of a wobble pit pattern, as shown in FIG. 8, cannot be applied to ROM type discs. The embodiments shown in FIGS. 7 through 12 can be effectively applied to RAM type discs such as DVD-RAMs and HD-RAMs.

Figure 1A:
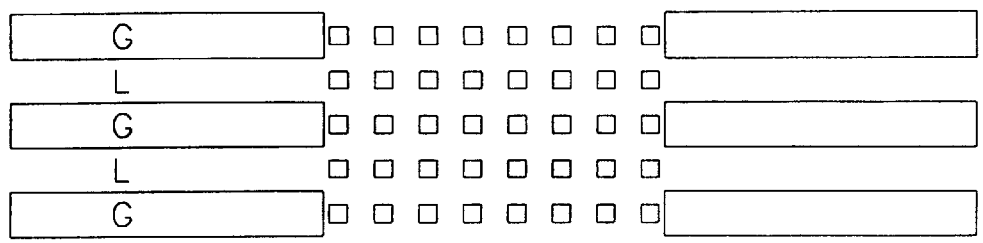
FIGS. 1A through 1D illustrate examples of the structure of headers in a conventional optical disc.
Figure 1B:
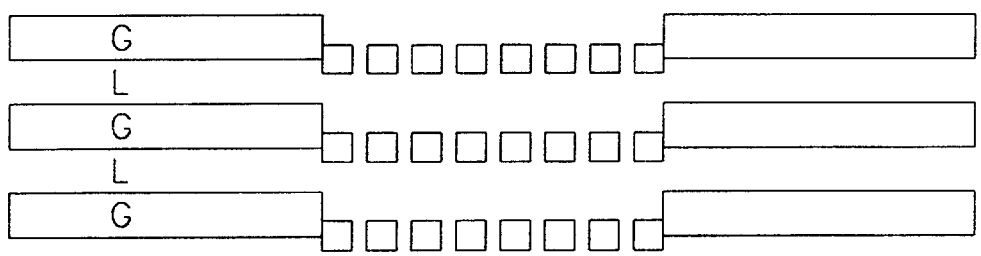
Figure 1C:
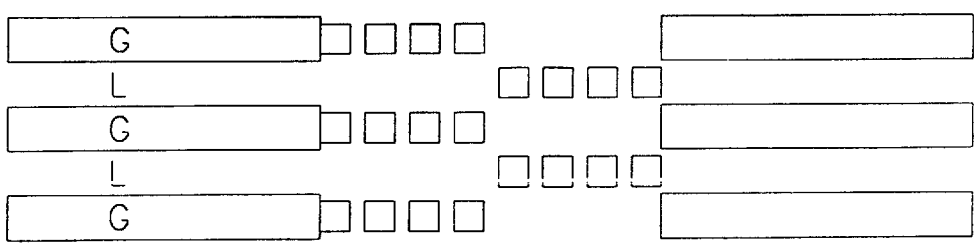
Figure 1D:
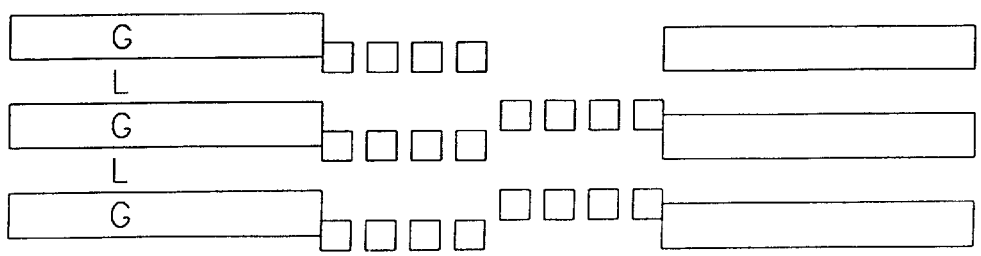
Figure 2A:
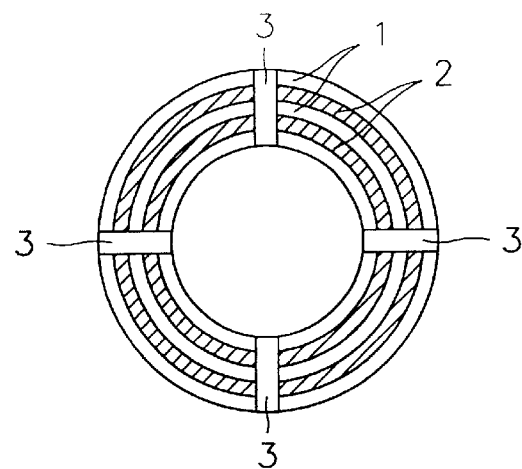
FIGS. 2A through 2C illustrate examples of the structure of tracks in a typical optical disc.
Figure 2B:
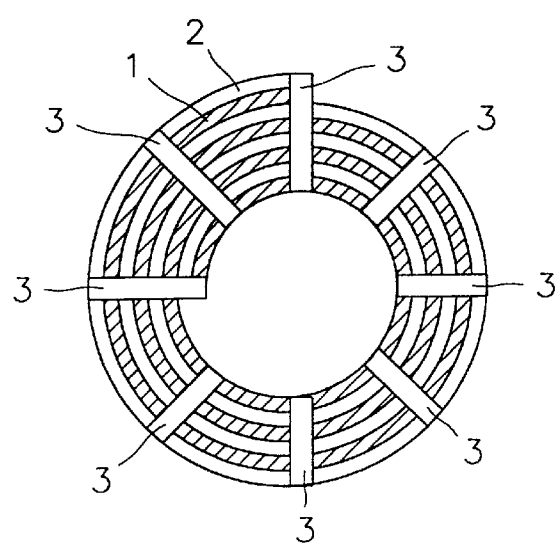
Figure 2C:
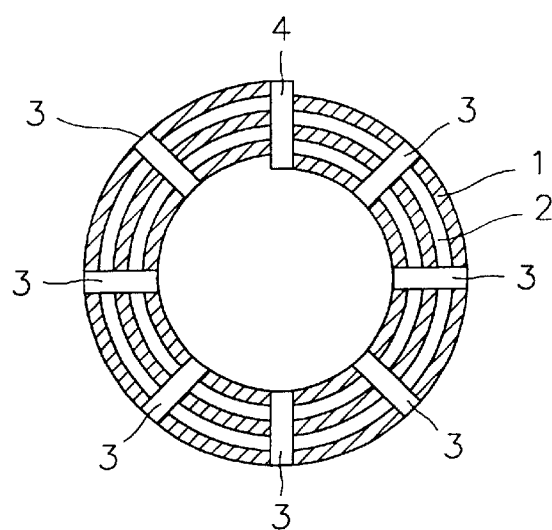
Figure 3A:
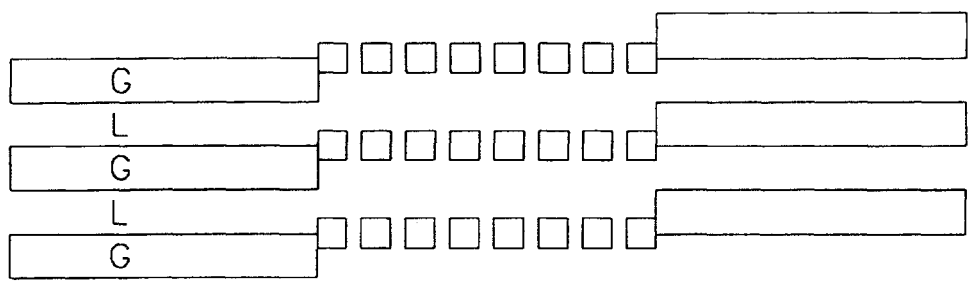
FIGS. 3A through 3C illustrate examples of conventional header structures at positions at which a land track transitions to a groove track and a groove track transitions to a land track.
Figure 3B:
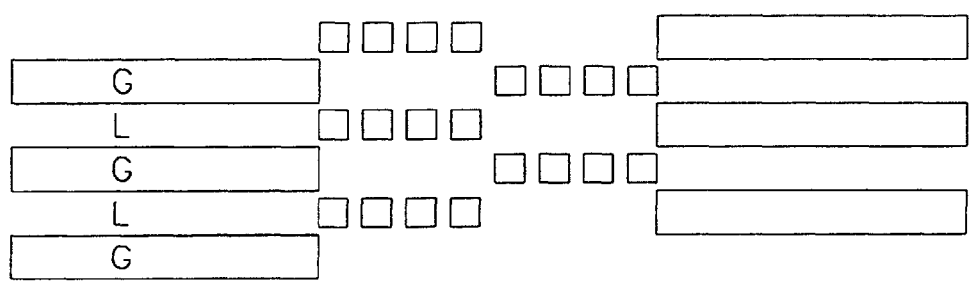
Figure 3C:
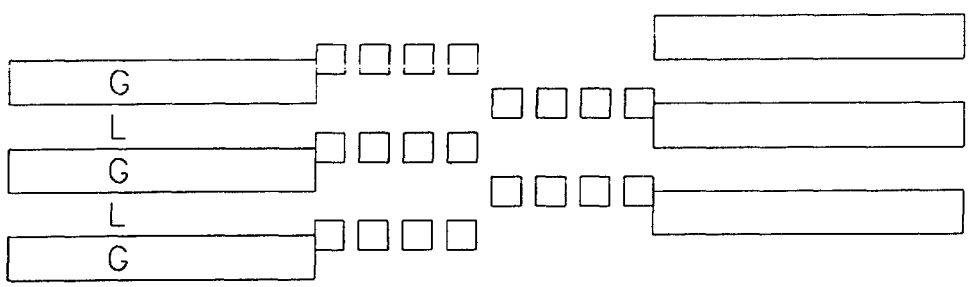
Figure 5:
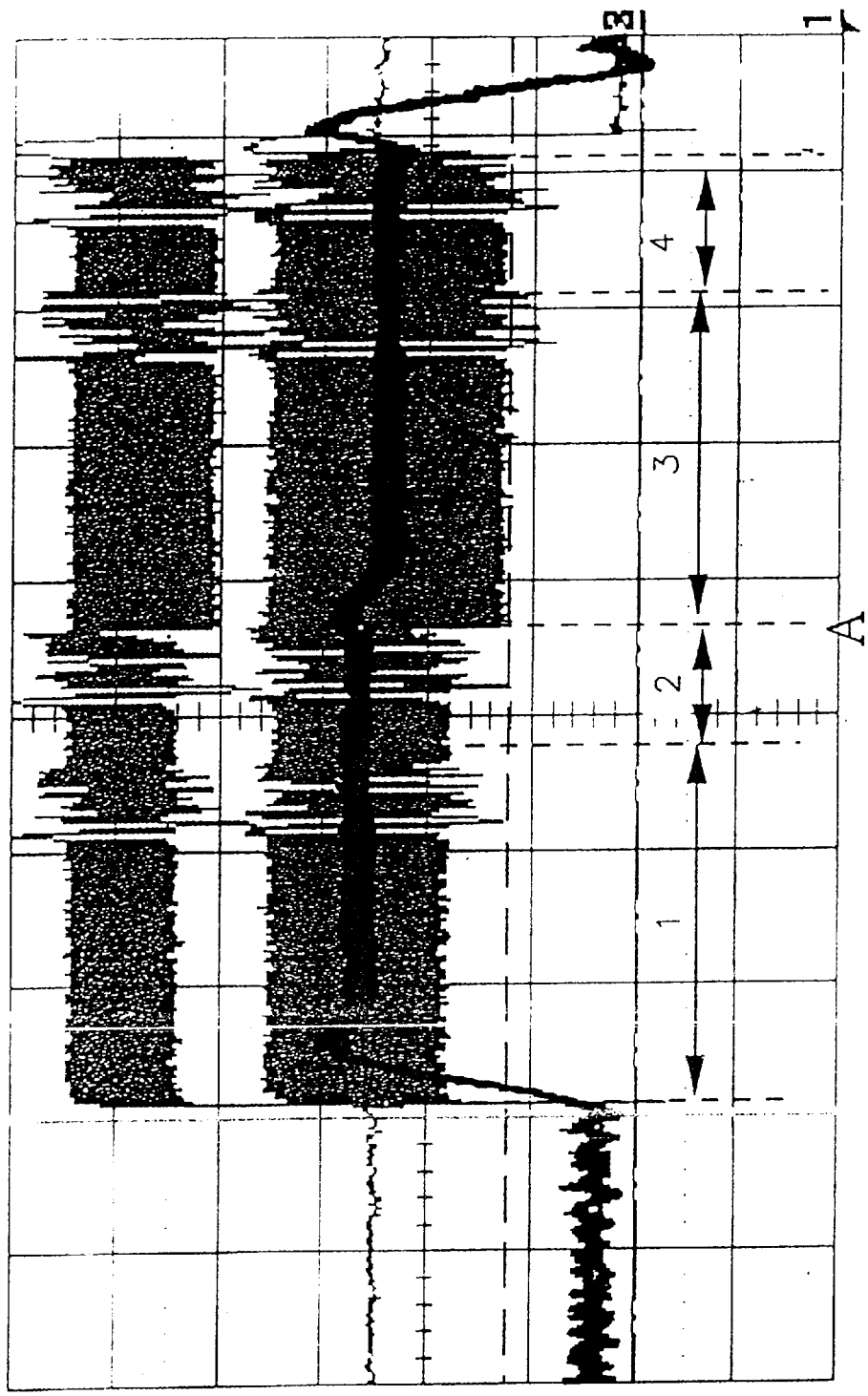
FIG. 5 is a diagram illustrating the header signal of FIG. 4B and a slice level.

The present invention can also be applied to the track structures shown in FIGS. 2A through 2C (a concentric circle structure, a double spiral structure and a single spiral structure). In the embodiments of FIGS. 7 through 12, a header is disposed in the middle of each of the land and groove tracks in a single spiral track structure. Since the header is disposed between adjacent land and/or groove tracks in the present invention, headers are not shifted by half of a track pitch as in a complementary allocated pit address (CAPA) structure used in conventional DVD-RAMs, Thus, the present invention does not have a conventional crosstalk problem and simplifies manufacturing. In addition, the present invention reduces the time delay necessary for determining a slicing level using the 36-byte VFO1 in each of the first and third header fields as shown in FIG. 5.

In another functional aspect of a header, the present invention can compensate for a tracking offset using mirrors, and compensate for tilting and de-tracking of a disc using mirrors and a pit signal. According to the present invention, a land track can be discriminated from a groove track using a wobble pit.

As described above, the present invention disposes a header between adjacent land and/or groove tracks and has portions, each of which includes a recording mark of a predetermined pattern, a wobble pit, a wobble groove and a predetermined pre-pit pattern, at predetermined intervals to physically divide a 4-KB area into 2-KB areas, thereby reducing overhead compared to a conventional header structure. According to the present invention, the position of a beam for forming a groove is the same as that for forming a header during the manufacture of headers, thereby simplifying manufacture.

What is claimed is:

1. An optical recording medium comprising:
    at least one basic recording unit, each basic recording unit being a sector of a first predetermined size, wherein a user area within each basic recording unit is physically divided by a predermined pattern into logical sectors of minimum recording units of a second predetermined size; and
    at least one header area, which indicates address information, with each header area being added to corresponding basic recording unit.

2. The optical recording medium of claim 1, wherein the address information is stored in each header area in the form of an even or odd sector number.

3. The optical recording medium of claim 1, wherein a recording mark of a predetermined pattern is formed at a boundary logically dividing the user area within each basic recording unit into the minimum recording units.

4. The optical recording medium of claim 1, wherein each header area is disposed between adjacent land and/or groove tracks, and includes half of a plurality of header fields offset from the other half of the plurality of header fields by one track pitch such that header fields in adjacent tracks are not adjacent.

5. The optical recording medium of claim 1, wherein each header area includes a plurality of header fields disposed between adjacent land and/or groove tracks, the header fields being disposed at the same respective positions between the land and groove tracks.

6. The optical recording medium of claim 1, wherein each header area includes a plurality of header fields disposed between adjacent land and/or groove tracks, the starting points of the header fields being different in different tracks such that similar header fields are not adjacent in adjacent land and groove tracks.

7. The optical recording medium of claim 1, wherein different modulation schemes are adopted for data in the header area and data in the user area.

8. The optical recording medium of claim 7, wherein a pit position modulation scheme is used for data in the header area, and a mark edge recording method is used for data in the user area.

9. An optical recording medium comprising:
   at least one basic recording unit, each basic recording unit being of a first predetermined size, wherein a user area within each basic recording unit is divided into minimum recording units of a second predetermined size; and
   at least one header area, which indicates address information, with each header area being added to corresponding basic recording unit,
   wherein the first predetermined size is 4 kilobytes and the second predetermined size is 2 kilobytes.

10. An optical recording medium comprising:
    at least one basic recording unit, each basic recording unit being of a first predetermined size, wherein a user area within each basic recording unit is divided into minimum recording units of a second predetermined size; and
    at least one header area, which indicates address information, with each header area being added to corresponding basic recording unit,
    wherein a predetermined pattern is formed on a mirror at a boundary in the form of pre-pits, the boundary logically dividing the user area within the basic recording unit into the minimum recording units.

11. An optical recording medium comprising:
    at least one basic recording unit, each basic recording unit being of a first predetermined size, wherein a user area within each basic recording unit is divided into minimum recording units of a second predetermined size; and
    at least one header area, which indicates address information, with each header area being added to corresponding basic recording unit,
    wherein a wobble groove is formed at a boundary logically dividing the user area within each basic recording unit into minimum recording units.

12. The optical recording medium of claim 11, wherein the frequency of the wobble groove is set to a frequency which is high enough to lock data in the next user area of the boundary logical division to a phase locked loop.

13. The optical recording medium of claim 11, wherein a land track and/or a groove track is a wobbled track of a predetermined frequency, and the frequency of the wobble groove is set to a frequency that is different from the land/groove wobble frequency when the land/groove wobble frequency is set to a frequency which is high enough to lock data to a phase locked loop.

14. An optical recording medium comprising:
    at least one basic recording unit, each basic recording unit being of a first predetermined size, wherein a user area within each basic recording unit is divided into minimum recording units of a second predetermined size; and
    at least one header area, which indicates address information, with each header area being added to corresponding basic recording unit,
    wherein a wobble pit pattern is formed at a boundary logically dividing the user area within each basic recording unit into the minimum recording units.

15. The optical recording medium of claim 14, wherein the wobble pit pattern discriminates between a land track and a groove track.

16. The optical recording medium of claim 14, wherein servo control is performed based on the signal of the wobble pit pattern.

17. The optical recording medium of claim 14, wherein each header area is disposed between adjacent land and/or groove tracks, and each header area further includes at least a mirror at the start or end thereof.

18. The optical recording medium of claim 17, further comprising a mirror at the end of the last basic recording unit in each track to provide land/groove switching information.

19. The optical recording medium of clam 18, wherein the length of the mirror at the end of the last basic recording unit is set to be different from the length of a mirror at the start of each basic recording unit indicating the land/groove transition information.

20. The optical recording medium of claim 18, wherein the position of the mirror at the end of the last basic recording unit of a track is different from the position of the mirrors at the start of other basic recording units of the track, indicating the land/groove switching information.

21. The optical recording medium of claim 18, wherein the number of mirrors at the end of the last basic recording unit of a track is set to be different from the number of mirrors at the start of each basic recording unit of the track indicating the land/groove transition information.

22. The optical recording medium of claim 17, wherein a predetermined pit pattern is recorded in a portion succeeding the last basic recording unit in each track indicating land/groove transition information.

23. An optical recording medium comprising:
    at least one basic recording unit, each basic recording unit being of a first predetermined size, wherein a user area within each basic recording unit is divided into minimum recording units of a second predetermined size; and
    at least one header area, which indicates address information, with each header area being added to corresponding basic recording unit,
    wherein difference in the length of a mirror immediately before each header area indicates whether a sector corresponding to each header area belongs to a land track or a groove track.

24. A method of recording/reproducing information on/from an optical recording medium in an optical recording medium recording and reproducing apparatus, the method comprising:
    recording address information in a header area added to each basic recording unit of a first predetermined size, the basic recording unit representing a physical sector; and physically dividing a user area by a predetermined pattern within the basic recoding unit into logical sectors of minimum recording units of a second predetermined size and recording information in the minimum recording units.

25. The method of claim 24, further comprising:
reading the address information in the header area from the optical recording medium and addressing the basic recording unit; and
reproducing data in the user area in the minimum recording units within the addressed basic recording unit.

26. The method of claim 24, wherein a skipping of one logical sector is based on the address information being an even or odd logical sector number.

27. The method of claim 24, wherein different data modulation schemes are used for the header area and the user area when recording information.

28. The method of claim 24, wherein a recording mark of a predetermined pattern is formed at a boundary logically dividing the user area within the basic recording unit into the minimum recording units.

29. A method of recording/reproducing information on/from an optical recording medium in an optical recording medium recording and reproducing apparatus, the method comprising:
recording address information in a header area added to each basic recording unit of a first predetermined size; and
dividing a user area within the basic recording unit into minimum recording units of a second predetermined size and recording information in the minimum recording units,
wherein the first predetermined size is 4 kilobytes and the second predetermined size is 2 kilobytes.

30. A method of recording/reproducing information on/from an optical recording medium in an optical recording medium recording and reproducing apparatus, the method comprising:
recording address information in a header area added to each basic recording unit of a first predetermined size; and
dividing a user area within the basic recording unit into minimum recording units of a second predetermined size and recording information in the minimum recording units,
wherein a predetermined pattern is formed on a mirror at a boundary in the form of pre-pits, the boundary logically dividing the user area within the basic recording unit into the minimum recording units.

31. A method of recording/reproducing information on/from an optical recording medium in an optical recording medium recording and reproducing apparatus, the method comprising:
recording address information in a header area added to each basic recording unit of a first predetermined size; and
dividing a user area within the basic recording unit into minimum recording units of a second predetermined size and recording information in the minimum recording units,
wherein a wobble groove is formed at a boundary logically dividing the user area within the basic recording unit into minimum recording units.

32. A method of recording/reproducing information on/from an optical recording medium in an optical recording medium recording and reproducing apparatus, the method comprising:

recording address information in a header area added to each basic recording unit of a first predetermined size; and
dividing a user area within the basic recording unit into minimum recording units of a second predetermined size and recording information in the minimum recording units,
wherein a wobble pit pattern is formed at a boundary for logically dividing the user area within the basic recording unit into the minimum recording units.

33. The method of claim 32, further comprising discriminating a land track from a groove track based on the wobble bit pattern.

34. The method of claim 32, further comprising performing servo control based on the signal of the wobble pit pattern.

35. An optical recording medium comprising a plurality of headers with basic recording units as physical sectors, respectively disposed on land and/or groove tracks between each header, wherein a user area within the basic recording unit is physically divided into logical sectors of minimum recording units, with a physical mark indicating the division at the division position.

36. The optical recording medium of claim 35, wherein the physical mark includes at least a mirror.

37. The optical recording medium of claim 35, wherein the header areas include at least a plurality of header fields.

38. The optical recording medium of claim 37, wherein the header areas include at least a mirror.

39. The optical recording medium of claim 37, wherein the plurality of header fields are disposed such that the starting points of the header fields are different in different tracks and are not adjacent in adjacent land and groove tracks.

40. The optical recording medium of claim 37, wherein the plurality of header fields are disposed at the same respective positions in the land and groove tracks.

41. The optical recording medium of claim 37, wherein the plurality of header fields are disposed such that half of the header fields are offset from the other half of header fields by one track pitch, without header fields in adjacent tracks being adjacent.

42. An optical recording medium comprising a plurality of headers with basic recording units respectively disposed on land and/or groove tracks between each header, wherein a user area within the basic recording unit is divided into minimum recording units, with a physical mark indicating the division at the division position,
wherein the physical mark is at least one pre-pit.

43. An optical recording medium comprising a plurality of headers with basic recording units respectively disposed on land and/or groove tracks between each header, wherein a user area within the basic recording unit is divided into minimum recording units, with a physical mark indicating the division at the division position,
wherein the physical mark is a wobble groove.

44. An optical recording medium comprising a plurality of headers with basic recording units respectively disposed on land and/or groove tracks between each header, wherein a user area within the basic recording unit is divided into minimum recording units, with a physical mark indicating the division at the division position,
wherein the physical mark is wobble pit pattern.

45. An optical recording medium comprising a plurality of headers with basic recording units respectively disposed on land and/or groove tracks between each header, wherein a user area within the basic recording unit is divided into minimum recording units, with a physical mark indicating the division at the division position, wherein a length of a mirror at an end of a last basic recording unit is set to be different from the length of a mirror at the start of each basic recording unit.

46. An optical recording medium comprising a plurality of headers with basic recording units respectively disposed on land and/or groove tracks between each header, wherein a user area within the basic recording unit is divided into minimum recording units, with a physical mark indicating the division at the division position, wherein the basic recording unit size is 4 kilobytes.

47. An optical recording medium comprising a plurality of headers with basic recording units respectively disposed on land and/or groove tracks between each header, wherein a user area within the basic recording unit is divided into minimum recording units, with a physical mark indicating the division at the division position, wherein the minimum recording unit size is 2 kilobytes.

48. A method of reproducing information from an optical recording medium, the optical recording medium having a basic recording unit, as a physical sector, physically divided into minimum recording unit by a predetermined pattern as logical sectors, and a plurality of headers, indicating address information, with the basic recording unit being disposed between headers on tracks in the optical recording medium, comprising:

reading the address information in the header area from the optical recording medium and addressing the basic recording unit; and reproducing data in the user area in the minimum recording units within the addressed basic recording unit.

49. The method of reproducing information of claim 48, wherein the physical division is at least one pre-pit.

50. The method of reproducing information of claim 48, wherein the physical division is a wobble groove.

51. The method of reproducing information of claim 48, wherein the physical division includes at least a mirror.

52. A method of reproducing information from an optical recording medium, the optical recording medium having a basic recording unit physically divided into minimum recording units and a plurality of headers, indicating address information, with the basic recording unit being disposed between headers on tracks in the optical recording medium, comprising:

reading the address information in the header area from the optical recording medium and addressing the basic recording unit; and reproducing data in the user area in the minimum recording units within the addressed basic recording unit, wherein the physical division is wobble pit pattern.

\* \* \* \* \*